(12) United States Patent
Patel et al.

(10) Patent No.: US 9,193,247 B2
(45) Date of Patent: Nov. 24, 2015

(54) VEHICLE DOOR TRIM PANEL SHUT FACE FEATURE TO REDUCE DEFLECTION

(71) Applicant: Ford Global Technologies, LLC, Dearborn, MI (US)

(72) Inventors: Deepak Patel, Canton, MI (US); Kirti Patel, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/645,553

(22) Filed: Oct. 5, 2012

(65) Prior Publication Data

US 2014/0096453 A1    Apr. 10, 2014

(51) Int. Cl.
*B60J 5/04*    (2006.01)
*B60R 13/02*    (2006.01)
*B60R 21/04*    (2006.01)

(52) U.S. Cl.
CPC ............... *B60J 5/045* (2013.01); *B60J 5/0452* (2013.01); *B60R 13/0243* (2013.01); *B60R 21/0428* (2013.01); *B60R 13/025* (2013.01); *B60R 2021/0435* (2013.01)

(58) Field of Classification Search
CPC ..... B60J 5/045; B60J 5/0452; B60R 21/0428; B60R 13/0243
USPC ........ 49/502; 296/146.1, 146.5, 146.6, 146.7, 296/146.9, 187.01, 187.02, 187.03, 187.05, 296/187.12
See application file for complete search history.

(56) References Cited

U.S. PATENT DOCUMENTS 4,786,100 A * 11/1988 Kleemann et al. ......... 296/146.6
5,040,335 A *  8/1991 Grimes ......................... 49/502

(Continued)

FOREIGN PATENT DOCUMENTS

JP    06270677 A *  9/1994 ................ B60J 5/04
JP    06270678 A *  9/1994 ................ B60J 5/04

(Continued)

OTHER PUBLICATIONS

Slik et al., "Use of High Efficient Energy Absorption Foam in Side Impact Padding", Mar. 1, 2007, www-nrd.nhtsa.dot.gov/pdf/esv/esv20/07-0185-W.pdf.

(Continued)

*Primary Examiner* — Jerry Redman
(74) *Attorney, Agent, or Firm* — LeClairRyan

(57) ABSTRACT

A door assembly for an automotive vehicle that reduces or eliminates thoracic or rib deflection in a side impact event is disclosed. The door assembly of the disclosed invention includes an inner door structure, an interior trim panel attached to the door structure and a shut face. The inner surface of the shut face includes a collapsible surface having a plurality of alternating raised areas and recessed areas formed thereon. The raised areas and recessed areas extend between one side of the door assembly and the other side of the door assembly. The shut face may be composed of beads, a foamed polymer or a solid polymer. In addition, the engineered surface may also be formed on the inner side of the face of one of the pillars. This configuration may be used in conjunction with a door shut face having an engineered surface or may be used independently.

17 Claims, 7 Drawing Sheets

(56) References Cited

U.S. PATENT DOCUMENTS

| | | | | |
|---|---|---|---|---|
| 5,433,478 | A * | 7/1995 | Naruse | 280/751 |
| 5,482,344 | A * | 1/1996 | Walker et al. | 296/39.1 |
| 5,871,253 | A * | 2/1999 | Erber | 296/146.6 |
| 6,805,397 | B1 * | 10/2004 | Chernoff et al. | 296/146.2 |
| 6,808,224 | B1 * | 10/2004 | Obara | 296/146.5 |
| 6,997,505 | B2 * | 2/2006 | Dry et al. | 296/146.7 |
| 7,059,658 | B2 * | 6/2006 | Ziegler et al. | 296/146.7 |
| 7,240,957 | B2 * | 7/2007 | Dry et al. | 296/153 |
| 7,357,444 | B2 * | 4/2008 | Cowelchuk et al. | 296/187.05 |
| 7,644,969 | B2 * | 1/2010 | Foster et al. | 296/1.08 |
| 7,744,983 | B2 * | 6/2010 | Ota et al. | 428/192 |
| 7,789,455 | B2 * | 9/2010 | Hall et al. | 296/187.05 |
| 7,845,705 | B2 * | 12/2010 | Meyer | 296/146.6 |
| 7,971,923 | B2 * | 7/2011 | Mazur et al. | 296/146.7 |
| 7,997,637 | B2 * | 8/2011 | Suzuki et al. | 296/146.7 |
| 8,011,717 | B2 * | 9/2011 | Endo et al. | 296/187.05 |
| 8,029,041 | B2 * | 10/2011 | Hall et al. | 296/146.6 |
| 8,096,604 | B2 * | 1/2012 | Asenkerschbaumer et al. | 296/146.6 |
| 8,297,675 | B2 * | 10/2012 | Someschan et al. | 296/1.08 |
| 2001/0017476 | A1 * | 8/2001 | Nishikawa et al. | 296/146.6 |
| 2003/0116993 | A1 * | 6/2003 | Skarb et al. | 296/146.7 |
| 2004/0100120 | A1 * | 5/2004 | Ziegler et al. | 296/146.7 |
| 2006/0043764 | A1 * | 3/2006 | Schroder et al. | 296/146.7 |
| 2007/0046064 | A1 * | 3/2007 | Winborn | 296/146.7 |
| 2008/0258496 | A1 * | 10/2008 | Foster et al. | 296/146.7 |
| 2008/0315621 | A1 * | 12/2008 | Alvehav et al. | 296/146.7 |
| 2009/0134660 | A1 * | 5/2009 | Pinkerton et al. | 296/146.7 |
| 2009/0179454 | A1 * | 7/2009 | Saida et al. | 296/146.7 |
| 2010/0187855 | A1 * | 7/2010 | Kitajima et al. | 296/146.7 |
| 2011/0012388 | A1 * | 1/2011 | Iida et al. | 296/146.9 |
| 2011/0089713 | A1 * | 4/2011 | Yamaguchi et al. | 296/146.7 |
| 2011/0221230 | A1 * | 9/2011 | Kato et al. | 296/146.7 |
| 2011/0254311 | A1 * | 10/2011 | Dajek et al. | 296/146.6 |
| 2013/0033066 | A1 * | 2/2013 | Tanizawa | 296/146.7 |
| 2013/0057024 | A1 * | 3/2013 | Wolff et al. | 296/187.05 |
| 2013/0106138 | A1 * | 5/2013 | Brockhoff et al. | 296/187.03 |
| 2013/0147230 | A1 * | 6/2013 | Hirose et al. | 296/146.7 |

FOREIGN PATENT DOCUMENTS

| | | | | |
|---|---|---|---|---|
| JP | 06270679 | A * | 9/1994 | B60J 5/04 |
| JP | 06270680 | A * | 9/1994 | B60J 5/04 |
| WO | 2007111787 | A1 | 10/2007 | |

OTHER PUBLICATIONS

Bartosiak et al., "The Use of Expanded Beam Foam Materials for Improved Safety in Automotive Interior Components," SAE Paper No. 890590, SAE International Congress and Exposition, Detroit, Michigan, Feb. 27-Mar. 3, 1989.

* cited by examiner

VEHICLE DOOR TRIM PANEL SHUT FACE FEATURE TO REDUCE DEFLECTION

TECHNICAL FIELD

The disclosed invention relates generally to door trim panels for vehicles. More particularly, the disclosed invention relates to an engineered surface of the shut face of the door trim panel of a vehicle to reduce thoracic or rib deflection in a side impact event. The engineered surface may also be formed in relation to the face of one of the vehicle pillars.

BACKGROUND OF THE INVENTION

Side impact events involving automotive vehicles typically include the imposition of dynamic loading to the vehicle and to the vehicle occupants. The side impact event imposes severe loading on the structural members of the body. The side impact event also may result in displacement of the thoracic region of an occupant, including the thoracic vertebrae and the associated ribs. During a side impact event there is a need to be at or below a stipulated thorax displacement for a given a load.

Vehicle doors are typically constructed with two or more panels attached to the door frame, an exterior or outer panel for shielding the passenger compartment from the elements, and an inner door panel that provides structural support. A trim panel is usually fastened to the inner door panel facing the passenger compartment and shields the vehicle occupants from internal door components, such as the window, the window regulator and the door locks. The trim panel can also provide aesthetic qualities to the interior passenger compartment as well as ergonomic features, for example, easily accessible door handles, mirror and window controls, and the like. Adjacent the trim panel is the vehicle door shut face. When the vehicle door is in its closed position, the shut face is not visible.

Because it is known that vehicles may collide with obstacles during operation efforts have been made with varying degrees of success to reduce the displacement of the thoracic region of the occupant. Automotive vehicles have been provided with various structural upgrades and restraint systems to lessen the effects of a collision type impact on an occupant compartment of the vehicle. Particularly, to lessen the effects of a side collision type impact of the vehicle occupant seating area, some vehicle door constructions may include a door intrusion guard beam, side bolsters of foam or honeycomb construction, or other body side structural upgrades. While such structural upgrades provide certain advantages, they are often relatively expensive and weighty. In addition, many of the known designs are effective in the instance of lateral intrusion but are not as effective in the instance of longitudinal intrusion.

Accordingly, as in so many areas of vehicle technology, there is room in the art of vehicle door design for an alternative configuration to known door structures which provides effective protection and minimal displacement of an occupant's thoracic region while maintaining relatively low manufacturing and assembly costs.

SUMMARY OF THE INVENTION

The disclosed invention provides a door assembly for an automotive vehicle that overcomes many of the deficiencies of known designs. Particularly, the door assembly of the disclosed invention includes an inner door structure, an interior trim panel attached to the door structure and a shut face. The shut face includes a collapsible inner surface having a plurality of alternating raised areas and recessed or weakened areas formed thereon. The raised and recessed areas may be of a variety of shapes. The door assembly has a top, a bottom, a first side and a second side. The raised and recessed areas have widths. The widths of some of the areas may be greater than the widths of other areas. The raised areas and recessed areas extend between one side of the door assembly and the other side of the door assembly. Thus configured the door assembly is tuned to enable a controlled collapse.

The shut face may be integral with the interior trim panel. The shut face may be formed from a partially or entirely hollow shell that is filled with individual elements such as beads. The beads are preferably but not exclusively formed from a polymerized material. Alternatively, the shut face may be composed of a polymer such as a foamed polymer. In such case the shut face may either be molded to include the raised areas and recessed areas or the recessed areas may be cut from a block.

In addition, the engineered surface may also be formed on the inner side of the face of one of the pillars. This configuration may be made in conjunction with a door shut face having an engineered surface or may be used independently.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
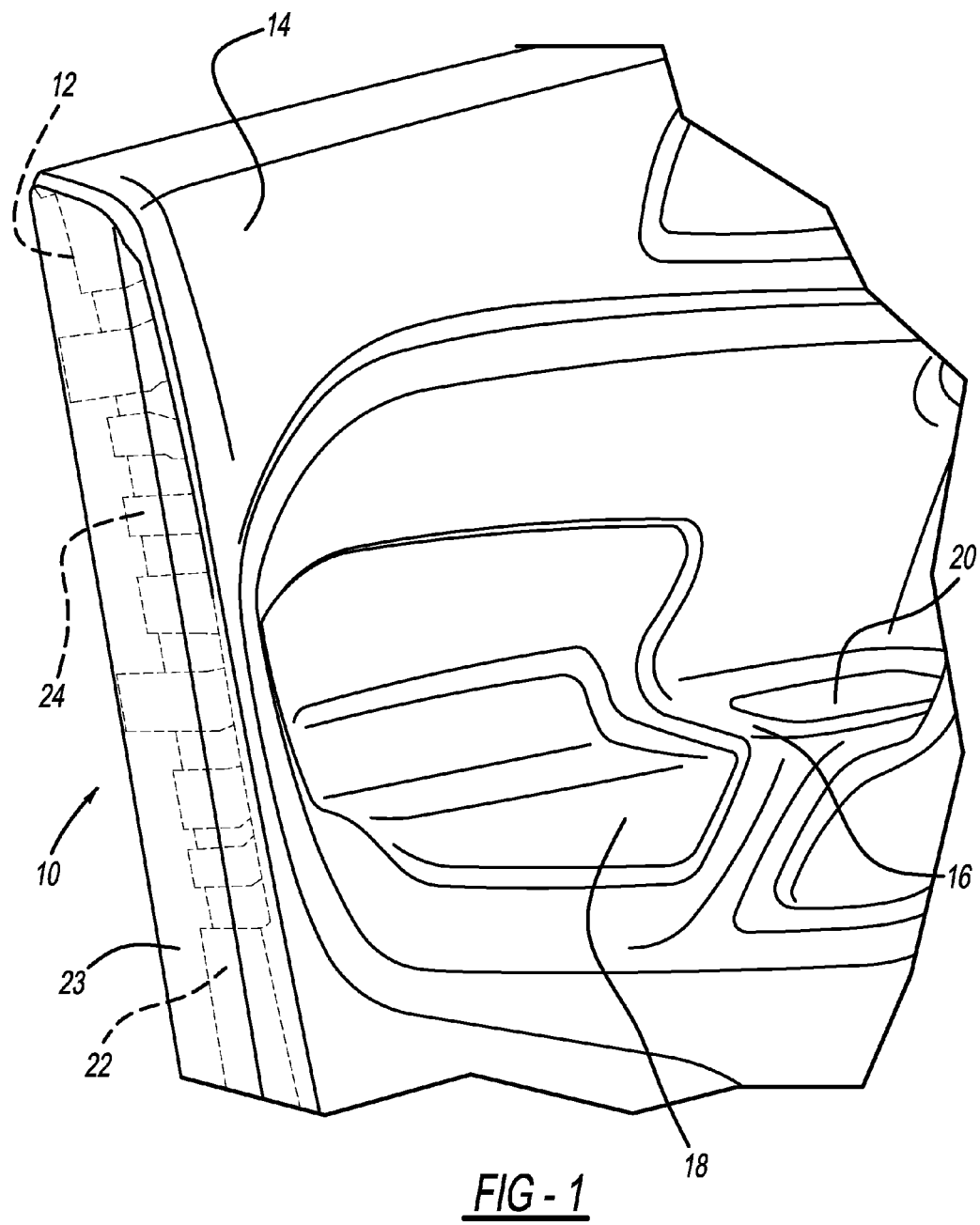
FIG. 1 is a perspective, partial view of a door assembly having the stepped shut face of the disclosed invention.

In the following figures, the same reference numerals will be used to refer to the same components. In the following description, various operating parameters and components are described for different constructed embodiments. These specific parameters and components are included as examples and are not meant to be limiting.

Figure 2:
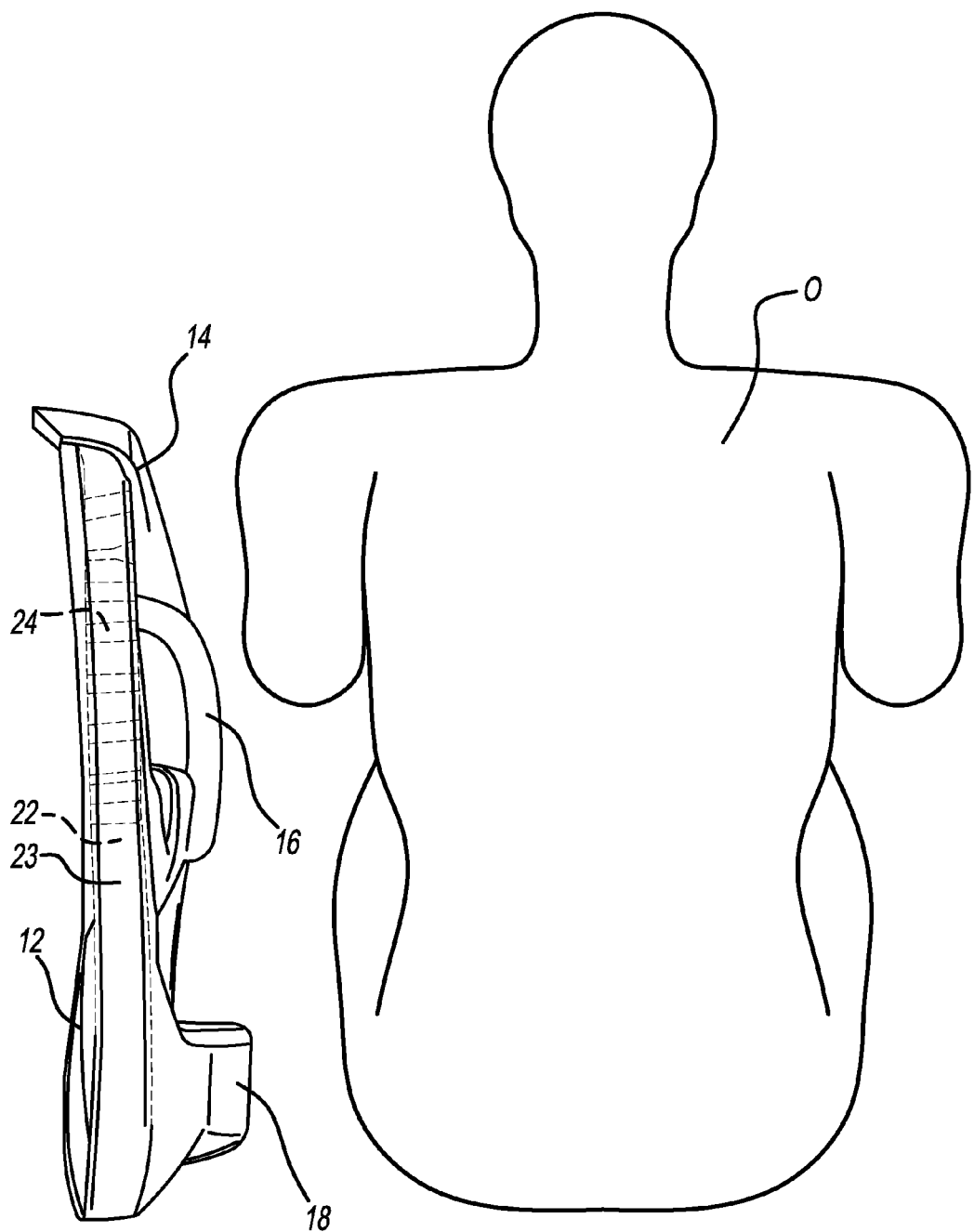
FIG. 2 is an elevated view looking vehicle-forward illustrating an end-on view of the stepped shut face of the door assembly of the disclosed invention and an adjacent vehicle occupant.
Figure 3:
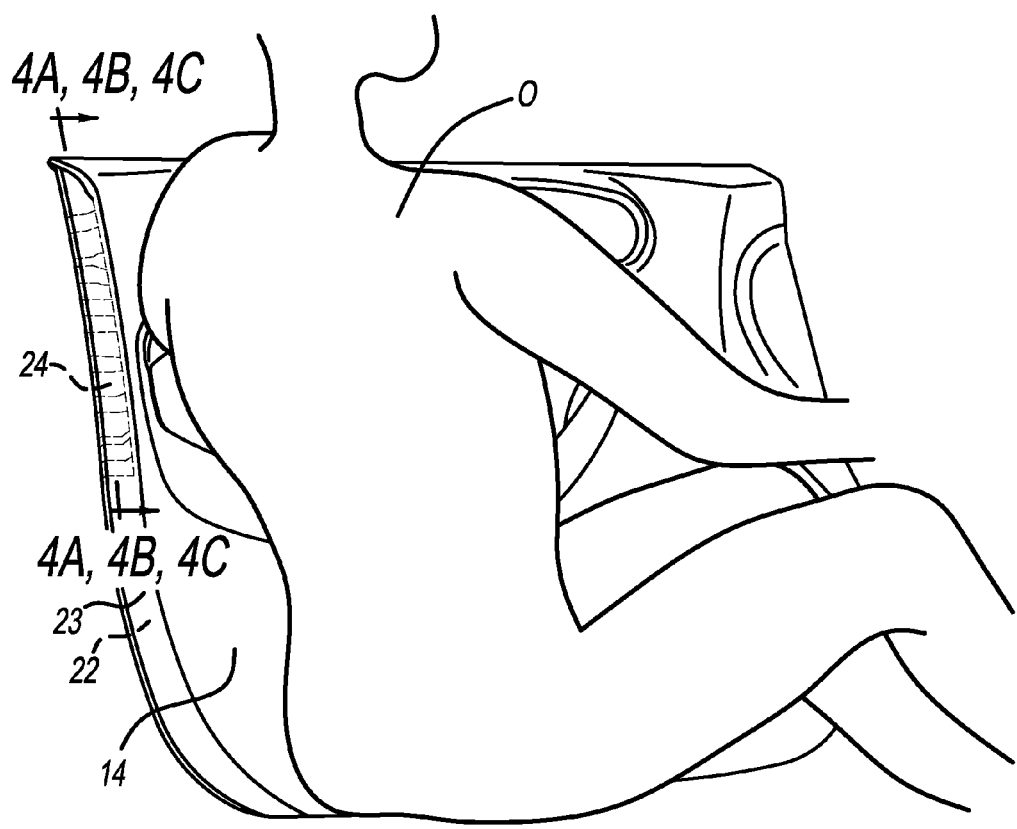
FIG. 3 is a perspective view of the door assembly of the disclosed invention and the adjacent vehicle occupant.

With respect to FIGS. 1, 2 and 3, a vehicle door assembly of the disclosed invention is generally illustrated as 10. It is to be understood that the configuration of the door assembly 10 is only suggestive and is not intended as being limiting. The vehicle door assembly 10 may be the front door, the middle door, or a sliding door of a vehicle and, in fact, have any application where a seated occupant, illustrated as ◯ in FIGS. 2 and 3, is adjacent the door.

The vehicle door assembly 10 includes an inner door structure 12 (best seen in FIG. 2) and a trim panel 14 attached thereto. An outer panel (not shown) is typically attached to the inner door structure 12. The inner door structure 12 is conventionally formed from a metal such as steel or aluminum, or alternatively may be formed from a polymerized material, such as a hard plastic or fiberglass. The scope of the disclosed invention is not limited by the type of material forming the inner door structure 12 nor is it limited by the shape of the outer skin 12.

The trim panel 14 typically includes a door handle 16 and a door bolster 18. The door handle 16 ordinarily includes associated pull cup 20. The door handle 16 and the bolster 18 may be of any of several designs that are known in the art. The door handle 16 and the bolster 18 may be molded as part of the trim panel 14 or may be formed separately and attached thereto.

The trim panel 14 further includes a shut face 22 preferably but not absolutely formed as part thereof. The shut face 22 includes an outer surface 23. The shut face 22 may be formed as part of the trim panel 14 of the disclosed invention and may be configured or tuned to control the collapse load in combination with the inner door structure 12.

According to the disclosed invention, the collapse load is also a function of the material of the inner door trim panel 14 and the thickness of the shut face 22. The disclosed invention sets forth a construction that enables the collapse of the inner door trim panel 14 at specified loads.

Particularly, the shut face 22 includes an outer surface 23 and inward-facing engineered surface 24 having a stepped configuration defined by a series of raised and recessed areas. As illustrated in FIGS. 1, 2 and 3, the engineered surface 24 may be formed along a portion of the inner side of the shut face 22. In the illustrated arrangement the engineered surface 24 is formed on the upper half of the inner side of the shut face 22, although it could be longer or shorter. In addition, while the engineered surface 24 is shown is a single, continuous region it is to be understood that it may be divided into two or more regions. Furthermore, while the engineered surface 24 is shown as being formed from edge to edge it is possible that it could be narrower.

Figure 4:
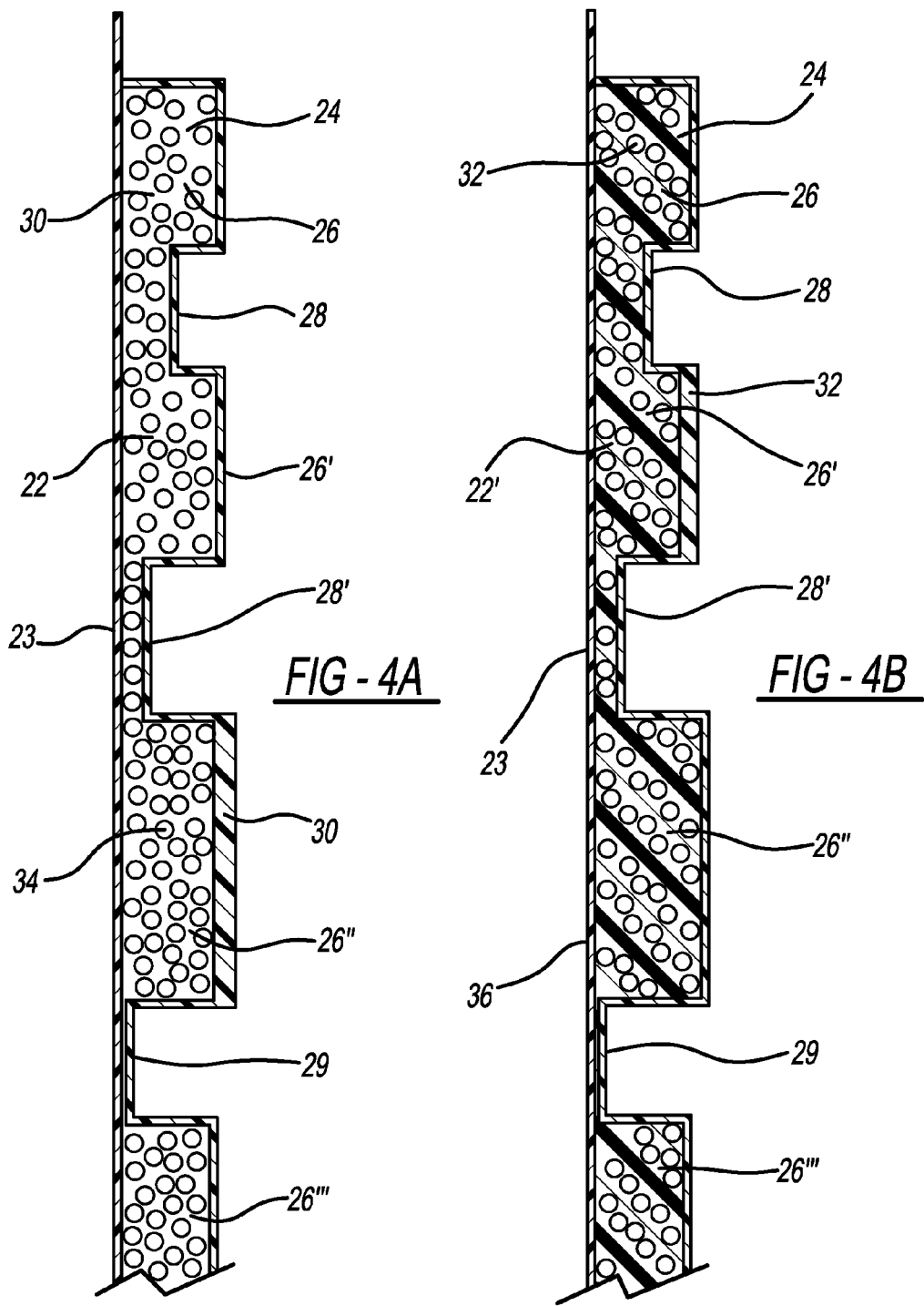
FIG. 4A is a sectional view of the stepped shut face of the disclosed invention taken along line 4A-4A of FIG. 3.
FIG. 4B is a sectional view of an alternate embodiment of the shut face of the disclosed invention taken along line 4B-4B of FIG. 3.
FIG. 4C is a sectional view of an additional alternate embodiment of the shut face of the disclosed invention taken along the line of 4C-4C of FIG. 3.

FIGS. 4A, 4B, and 4C are taken along lines 4A-4A, 4B-4B, and 4C-4C of FIG. 3 and illustrate the engineered surface 24 in cross section according to three embodiments with each embodiment having the same outer profile but being directed to a different composition.

The shut face 22 of FIG. 4A, the shut face 22' of FIG. 4B, and the shut face 22" of FIG. 4C each includes a series of alternating raised and recessed areas formed on the inner sides of the shut faces. The number and configuration of the raised and recessed areas represented in these figures is illustrative only and is not intended as being limiting.

As shown in FIGS. 4A and 4B, the engineered surface 24 includes raised areas 26, 26', 26", and 26'" and interspaced recessed areas 28, 28' and 28". The width, depth, and spacing of the raised and recessed areas may be varied according to a particular application and with a target displacement in mind.

For example, the depth of the recessed area may be right up to the outer surface 23 as illustrated by recessed areas 29 in FIGS. 4A and 4B. As a further example of how the width, depth, and spacing of the raised and recessed areas may be varied, thicker raised areas may be employed, such as the added thickness 30 formed on the raised area 26" of the shut face 22 of FIG. 4A or the added thickness 32 formed on the raised area 26' of the shut face 22' of FIG. 4B.

As shown in FIG. 4C, a plurality of recessed areas 42, 42' and 42" having curved surfaces are formed in the inner side of the shut face 22". The width, depth, and spacing of the raised and recessed areas may be varied according to a particular application and with a target displacement in mind.

The shut faces of the disclosed invention may be composed of a wide variety of materials and two possible materials are illustrated in FIGS. 4A, 4B and 4C. The suggested materials are not intended as being limiting but are intended rather as being suggestive.

With respect to the shut face 22 illustrated in FIG. 4A, this embodiment is composed of a partially or entirely hollow shell that includes a plurality of beads 34 preferably formed from a polymerized material. The beads 34 are added or removed from the outer shell of the shut face 22. The orientation, the dimension and the shape of the beads 34 may be varied such that the overall design gives the collapse load targeted. The beads 34 artificially increase or decrease the wall thickness of the shut face 22. Thus the wall thickness over length is stepped as opposed to smooth variation.

Alternatively, and with respect to FIG. 4B, the shut face 22' may be formed from a foamed polymer 36. A variety of such polymers may be employed as is known in the art. The shut face 22' shown in FIG. 4B may be molded with the illustrated raised areas 26, 26', 26", and 26'" and interspaced recessed areas 28, 28' and 28" or may acquire the stepped configuration by the shut face 22' being formed with the highest raised area followed by scouring, sculpting or removal in some other manner of the excess wall.

The shut face 22' may be formed from molding in a die having the raised and recessed areas formed therein or may be formed from a solid block with the recessed areas cut therefrom.

As a further variation the shut face 22" is formed from a solid, non-foamed polymer. A variety of such polymers may be employed as is known in the art.

Figure 5:
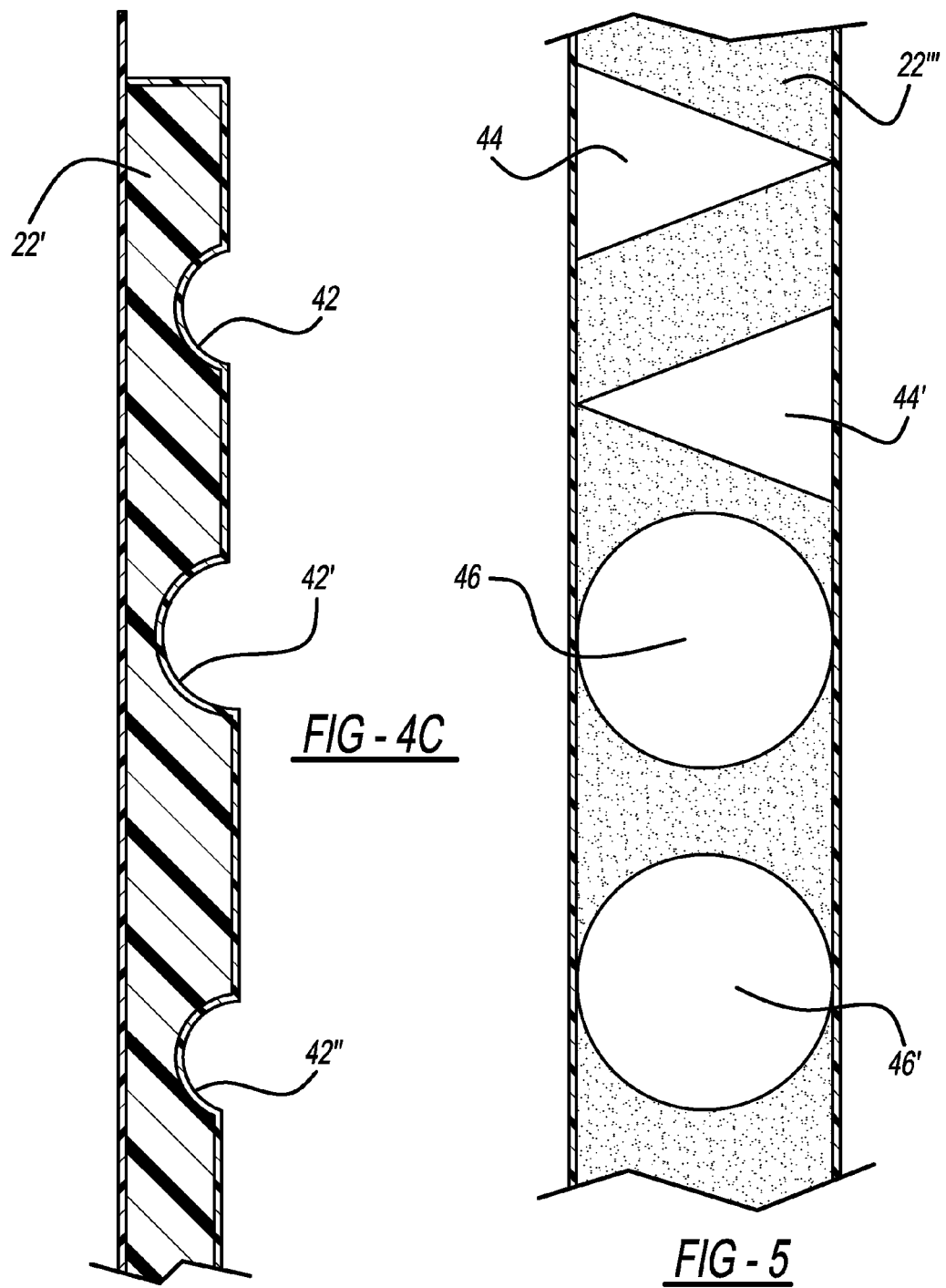
FIG. 5 is a plan view of various shapes of alternative designs of raised areas according to various embodiments of the disclosed invention.

FIG. 5 illustrates a plan view of the inner side of a shut face 22'" according to the disclosed invention. As noted above, the raised portions of the inner surface may have a variety of shapes beyond the substantially square or rectangular configurations shown in FIGS. 1 through 3. Such alternative shapes may be, for example, triangular as shown as raised areas 44 and 44' of FIG. 5 or may be circular or curvilinear as shown as raised areas 46 and 46'. The illustrated shapes are intended as being suggestive and non-limiting.

Figure 6:
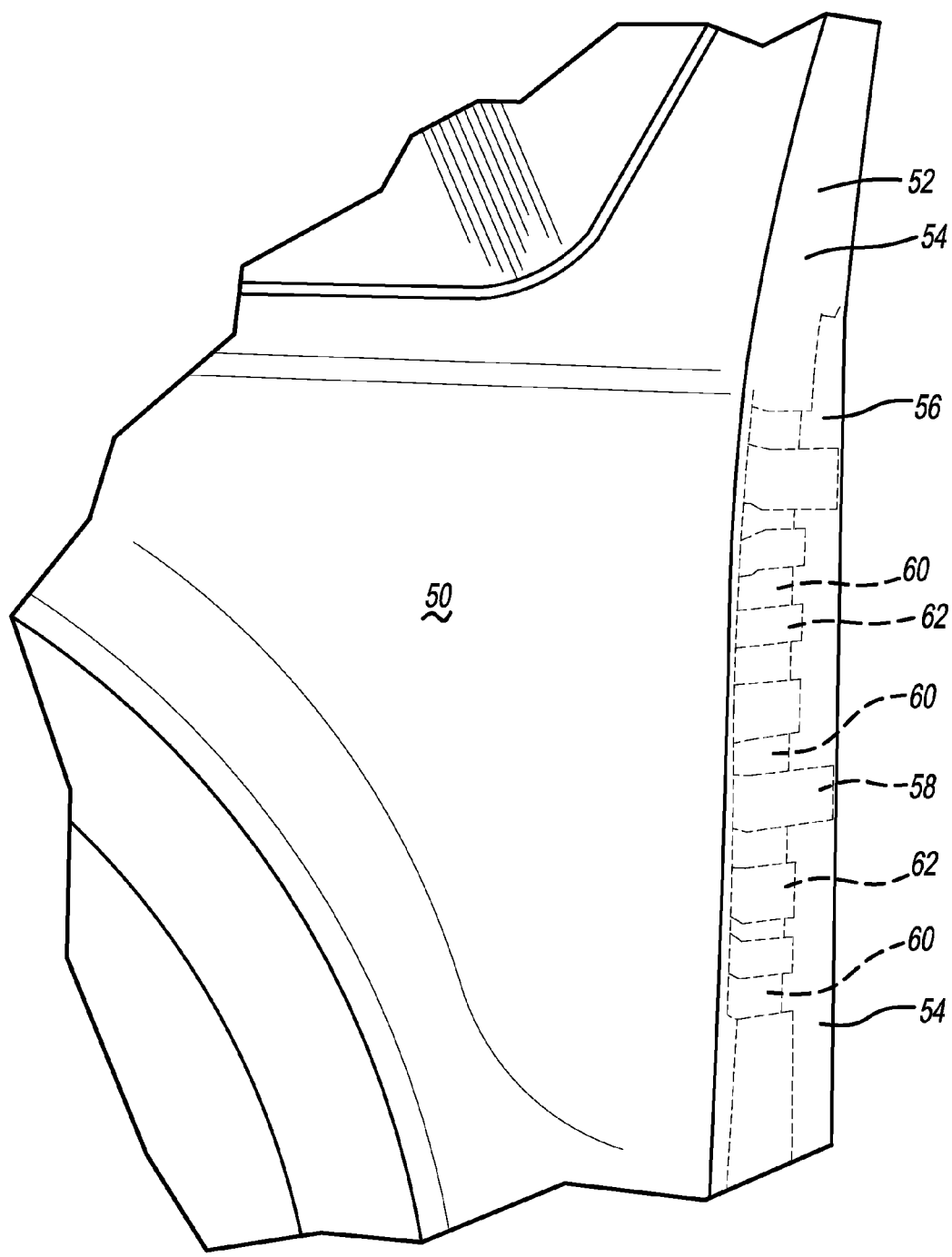
FIG. 6 is a perspective, partial view of the B-pillar and its associated body segment having the stepped face of the disclosed invention.

The engineered surface of the disclosed invention and the benefits derived from such a construction are not limited to the door shut face as set forth above. In addition to finding application in the door shut face, the engineered surface may also be incorporated into the face of the B-pillar or the C-pillar. FIG. 6 illustrates a vehicle body segment 50 adjacent to a body pillar, such as a B-pillar 52. It is to be understood that the body segment 50 and the associated pillar 52 are not intended to be limiting but instead are intended as being merely suggestive as other body segment and pillar configurations are possible.

The B-pillar 52 includes a pillar face 54. The pillar face 54 is preferably but not absolutely formed as part of the B-pillar 52. The pillar face 54 includes an outer surface 56. The pillar face 54 may be formed as part of the B-pillar 52 and may be configured or tuned to control the collapse load. The collapse load is a function of the thickness and engineering of the B-pillar face 22.

The B-pillar face 54 includes an outer surface 56 and inward-facing engineered surface 58 having a stepped configuration defined by a series of raised areas 60 and recessed areas 62. The engineered surface 58 may be formed along a portion of the inner side of the B-pillar face 54. In FIG. 6 the engineered surface 58 is formed on the lower portion of the inner side of the B-pillar face 54. While illustrated as a single, continuous region it is to be understood that the engineered surface 58 may be divided into two or more regions. Furthermore, while the engineered surface 58 is shown as being formed from edge to edge it is possible that it could be narrower.

As with the embodiment of the door shut face shown in FIGS. 1 through 3 and as discussed in relation thereto, the raised areas 60 and recessed areas 62 of the engineered surface 58 may be of a variety of configurations, including those illustrated in FIGS. 4A-4C and discussed in relation thereto.

The engineered surface formed on the inner surface of the door shut face and the engineered surface formed on the inner side of the face of the vehicle pillar may be used independently or may be used in combination.

The disclosed invention overcomes the problems associated with known vehicle door assembly designs in which deflection is often uncontrolled or is poorly controlled given the stiffness or other inadequacies of known shut face designs. As noted above, the engineered surfaces 24 and 58 may be configured or tuned in combination with their associated structures 12 to collapse at a specific load. The engineered surfaces 24 and 58 may be introduced into production with relative ease and the stipulated thorax displacement at a given load can thus be readily satisfied. The engineered surfaces 24 and 58 also avoid the problems of warping and other craftsmanship concerns that are known to challenge current designs.

The disclosed invention overcomes many of the displacement problems frequently associated with known vehicle door assembly designs. As evidence of the improvement represented by the disclosed design, FIG. 7 illustrates the results of comparative side impact testing between a vehicle door assembly with the engineered surface 24 of the shut face 22 of the disclosed invention and a vehicle door assembly without the engineered surface 24 of the shut face 22.

Figure 7:
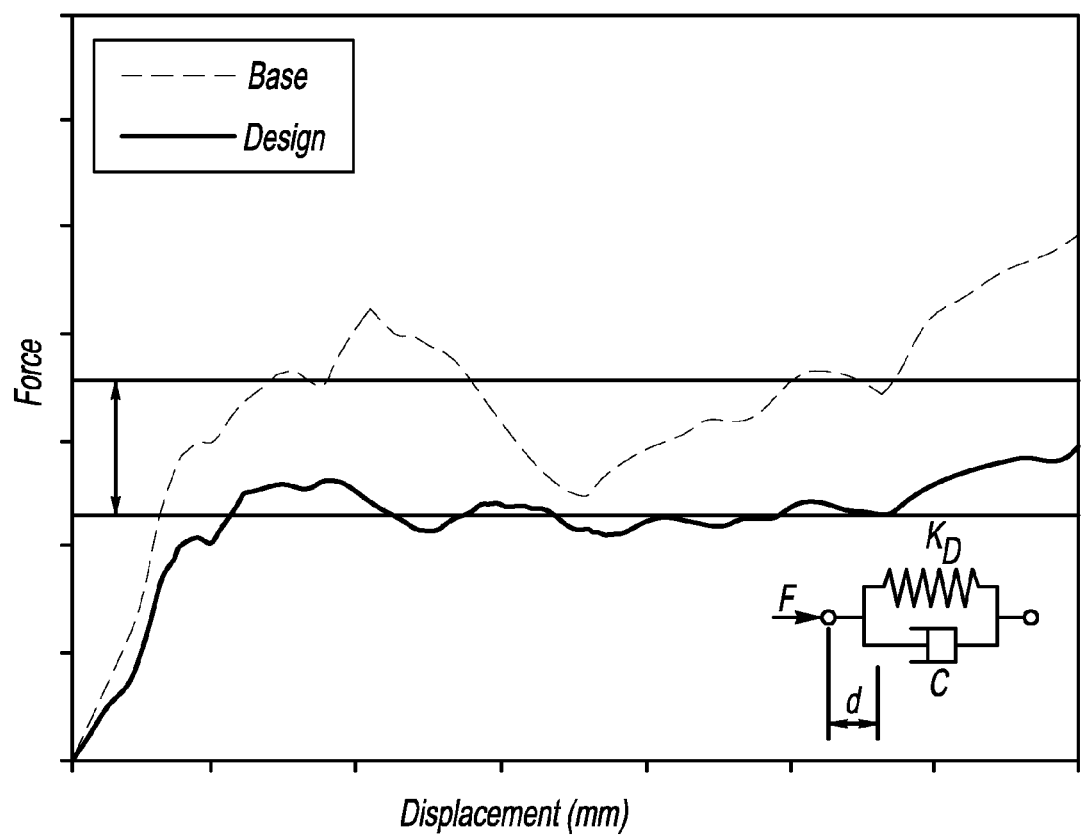
FIG. 7 is a graph illustrating a comparison of displacement vs. force between the known art and the disclosed invention.

In the graph of FIG. 7 force is set forth on the y-axis while displacement (in mm) is set forth on the x-axis. The dashed line represents trim reaction force vs. displacement when a vehicle door assembly is impacted without having the benefit of the engineered surface 14 of the shut face 22 according to the disclosed invention while the upper horizontal straight line is the average collapse force according to this prior art arrangement. The solid line represents trim reaction force vs. displacement with the benefit of the engineered surface 14 of the shut face 22 according to the disclosed invention while the lower horizontal straight line is the average collapse force according to the disclosed invention. It is clear from these results that the input force to the test dummy is significantly lower when the engineered surface 14 of the shut face 22 is in use.

Accordingly, it can be understood that the disclosed invention offers several advantages over known vehicle door assemblies in the reduction of thoracic displacement of an occupant. The inner door trim panel 14 and its associated shut face 22 demonstrate repeatability in terms of the degree of collapse when subject to a specific load. Thus the arrangement of the disclosed invention offers predictability of thoracic displacement in the event of a side impact. Furthermore, the arrangement of the disclosed invention reduces or eliminates warping of the shut face in the event of a side impact. In addition, the arrangement of the disclosed invention may be easily adapted to existing inner door structures without the need for extensive modification. Finally, the arrangement of the disclosed invention is relatively inexpensive to manufacture and install.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for a vehicle, the assembly having a front end and a back end, the assembly comprising:
   an inner door structure;
   an interior trim panel attached to said door structure; and
   a shut face, said shut face including an external, outer surface and an internal, engineered surface, said engineered surface having a plurality of alternating raised areas having surfaces and recessed areas having surfaces, said raised areas extending from said outer surface toward the front end of the assembly, each of said raised area having a height, the height of at least one raised area being greater than the heights of other raised areas.

2. The door assembly of claim 1 wherein said inner door structure has a vehicle outward side and a vehicle inward side and wherein said recessed areas are defined generally perpendicularly between said vehicle outward side and said vehicle inward side of said inner door structure.

3. The door assembly of claim 1 wherein said shut face is composed of beads.

4. The door assembly of claim 1 wherein said shut face is composed of a foamed polymer.

5. The door assembly of claim 1 wherein said shut face is integral with said interior trim panel.

6. The door assembly of claim 1 wherein said shut face is composed of a solid polymerized material from which said recessed areas are cut.

7. The door assembly of claim 1 wherein said shut face is molded.

8. A door assembly for a vehicle, the assembly having a top and a bottom, a first side, a second side and an inside, the assembly comprising:
   an inner door structure;
   an outer skin; and
   a shut face, said shut face including an outer surface and a collapsible surface, said collapsible surface having a plurality of raised areas and recessed areas, said recessed areas extending toward the inside of the door from said outer surface, said raised areas having heights, the height of at least one raised area being greater than the heights of other raised areas.

9. The door assembly of claim 8 wherein said shut face is composed of beads.

10. The door assembly of claim 8 wherein said shut face is composed of a foamed polymer.

11. The door assembly of claim 8 wherein said shut face is composed of a solid polymerized material from which said recessed areas are cut.

12. The door assembly of claim 8 further including an interior trim panel and wherein said shut face is integral with said interior trim panel.

13. A construction for a vehicle comprising:
a door having an inside, said door further having a top and bottom defining a height therebetween;
a pillar having an inside, said pillar being associated with said door, said pillar having a top and bottom defining a height therebetween;
a face formed on at least one of said door or said pillar, said face having an outer surface, said surface having an irregular contour defined by raised areas and recessed areas, said recessed areas being perpendicular to said heights, said raised areas having heights, the height of at least one raised area being greater than the heights of other raised areas, said raised areas being connected to said face and extending toward said inside of said door from said outer surface when formed on said door or extending toward said inside of said pillar from said outer surface when formed on said pillar.

14. The construction for a vehicle of claim 13 wherein said face has an vehicle outward side and a vehicle inward side and wherein said recessed areas are defined generally perpendicularly between said vehicle outward side and said vehicle inward side of said face.

15. The construction for a vehicle of claim 13 wherein said face is composed of beads.

16. The construction for a vehicle of claim 13 wherein said face is composed of a foamed polymer.

17. The construction for a vehicle of claim 13 wherein said face is integral with said structure.

* * * * *